United States Patent
Tweitmann et al.

(10) Patent No.: US 8,933,365 B2
(45) Date of Patent: Jan. 13, 2015

(54) NOZZLE HOLDERS AND RELATED SYSTEMS

(71) Applicant: TRUMPF Maschinen AG, Baar (CH)

(72) Inventors: Mathias Tweitmann, Waedenswil (CH); Adrian Gisler, Baar (CH)

(73) Assignee: TRUMPF Maschinen AG, Baar (CH)

( * ) Notice: Subject to any disclaimer, the term of this patent is extended or adjusted under 35 U.S.C. 154(b) by 309 days.

(21) Appl. No.: 13/668,689

(22) Filed: Nov. 5, 2012

(65) Prior Publication Data

US 2013/0112668 A1 May 9, 2013

(30) Foreign Application Priority Data

Nov. 7, 2011 (EP) .................................... 11188066

(51) Int. Cl.
| | |
|---|---|
| *B23K 26/06* | (2014.01) |
| *B23K 26/14* | (2014.01) |
| *B23Q 3/155* | (2006.01) |
| *B23K 26/30* | (2014.01) |

(52) U.S. Cl.
CPC ............. *B23K 26/1482* (2013.01); *B23K 26/14* (2013.01); *B23K 26/06* (2013.01); *B23Q 3/155* (2013.01); *B23K 26/422* (2013.01)
USPC .................................... 219/121.6; 219/121.67

(58) Field of Classification Search
CPC ......... B23K 26/06; B23K 26/14; B23Q 3/155
USPC ................. 219/121.6, 121.63–121.72; 82/159
See application file for complete search history.

(56) References Cited

U.S. PATENT DOCUMENTS

| | | | |
|---|---|---|---|
| 3,604,565 A | | 9/1971 | Freeman |
| 4,294,365 A | * | 10/1981 | Henderson .................... 211/60.1 |
| 5,229,572 A | * | 7/1993 | Ito ............................. 219/121.67 |
| 6,723,947 B2 | * | 4/2004 | Inoue et al. ................. 219/121.6 |
| 2005/0263508 A1 | | 12/2005 | Yamazaki et al. |
| 2009/0179018 A1 | | 7/2009 | Erlenmaier et al. |
| 2009/0181837 A1 | | 7/2009 | Erlenmaier et al. |
| 2011/0015050 A1 | | 1/2011 | Hakamata |

FOREIGN PATENT DOCUMENTS

| | | |
|---|---|---|
| DE | 10056330 C1 | 3/2002 |
| DE | 102010027247 A1 | 1/2011 |
| EP | 1602439 A2 | 12/2005 |
| EP | 2078583 A1 | 7/2009 |
| EP | 2078584 A1 | 7/2009 |
| JP | 61192436 A | 8/1986 |
| JP | 61197106 A | 9/1986 |
| JP | 10006062 A | 1/1998 |

* cited by examiner

*Primary Examiner* — Samuel M Heinrich
(74) *Attorney, Agent, or Firm* — Fish & Richardson P.C.

(57) ABSTRACT

A nozzle holder for a nozzle changer that is configured for at least one of mounting nozzles to and demounting nozzles from a processing head of a laser processing machine includes a nozzle storage chamber that widens along a nozzle removal direction to a nozzle removal opening. The nozzle storage chamber includes at least two nozzle storage seats that are offset in steps from each other and that store respective nozzles. A nozzle changer includes such several nozzle holders, and a laser processing machine includes such a nozzle changer.

10 Claims, 6 Drawing Sheets

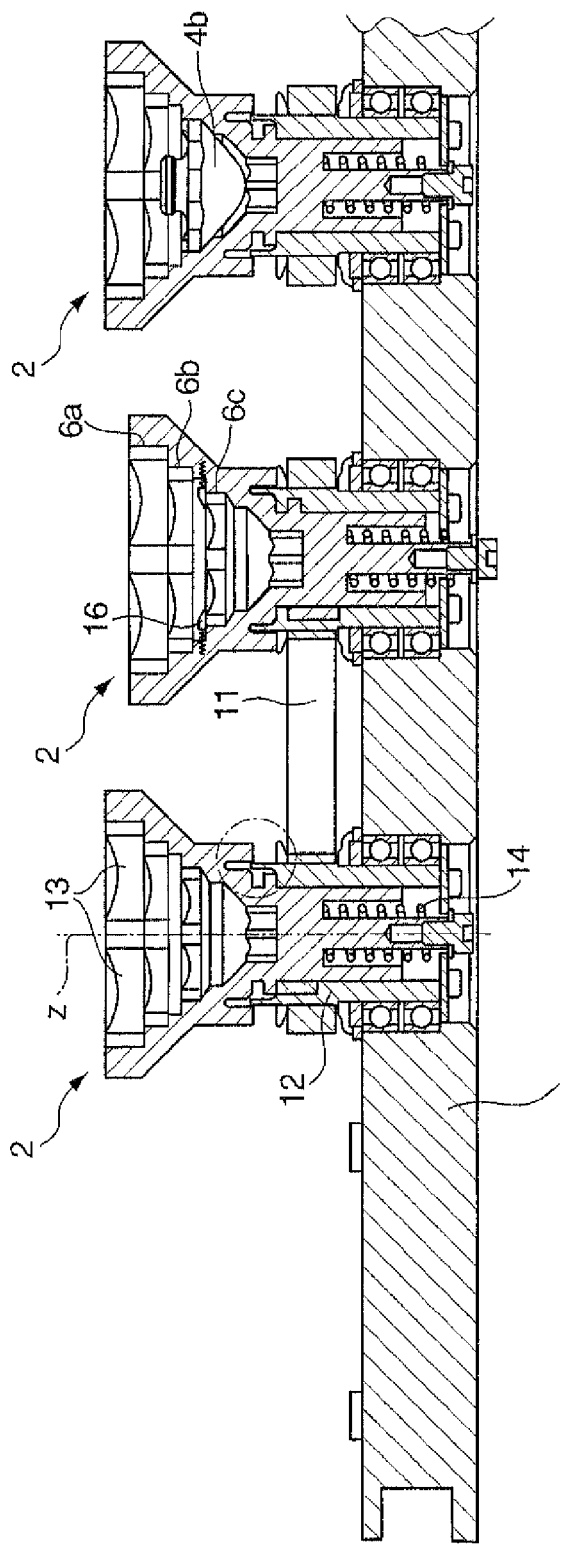
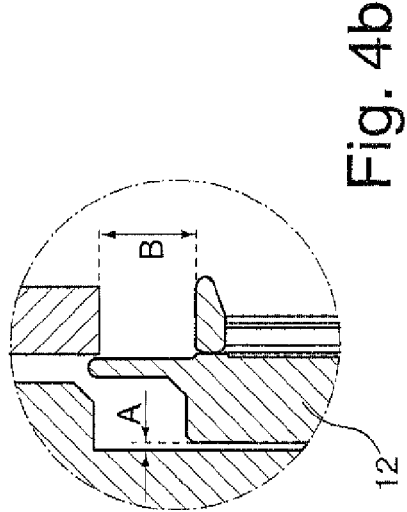

NOZZLE HOLDERS AND RELATED SYSTEMS

CROSS REFERENCE TO RELATED APPLICATION

This application claims priority under 35 U.S.C. §119(a) to European Application No. 11 188 066.2, filed on Nov. 7, 2011, the entire contents of which are hereby incorporated by reference.

TECHNICAL FIELD

The present disclosure relates to nozzle holders and related systems.

BACKGROUND

Laser nozzles that are attached to processing heads of laser processing devices for carrying out processing operations may be contaminated or damaged by collisions with workpiece parts and by spatters and dirt from the processing operations. Laser nozzles are therefore expendable items that, for reasons related to process safety, should be regularly changed. A nozzle may also be changed when the type of material or material thickness of a workpiece is changed or when new processing strategies are carried out, such as, two-dimensional laser cutting with a mirror cutting head and/or with water cooling, which may require the use of different nozzle geometries. Conventional processes for changing different types of nozzles (e.g., especially new types of nozzles) are not automated and are therefore typically performed manually, since conventional nozzle changers are typically configured only for changing standard types of nozzles.

SUMMARY

The present disclosure is directed to a nozzle holder, a nozzle changer that includes several nozzle holders, and a laser processing machine that includes such a nozzle changer, thereby permitting flexible, automated management and storage of various types of nozzles.

In one aspect of the invention, a nozzle holder includes a stepped nozzle storage chamber that widens in a nozzle removal direction to a nozzle removal opening. The nozzle storage chamber includes at least two (e.g., at least three) nozzle storage seats that are offset in steps from each other and that store respective nozzles.

The nozzle storage chamber has a substantially funnel-shaped construction that accommodates multiple nozzles and different types of nozzles at respective storage locations. In some embodiments, the nozzles have different outer contours (e.g., differently sized outer contours) and can be removed in an automated process through the nozzle removal opening. In some examples, the outer contour of the nozzle may be provided by a peripheral edge or surface of the nozzle that is perpendicular to a nozzle axis (e.g., a central nozzle axis) that coincides with the nozzle removal direction. In certain embodiments, the outer contours of different types of nozzles may differ in size and/or in shape.

In some embodiments, the nozzle storage seats allow nozzles of different outer contours to be placed therein and are offset from each other in steps along the nozzle removal direction. The nozzle storage seats are thus located at different heights along the nozzle removal direction, wherein the nozzle storage seat for receiving the nozzle having the largest cross-section is located adjacent to the nozzle removal opening of the nozzle storage chamber.

In certain embodiments, the nozzle holder is made of a rigid material, such as metal (e.g., aluminum), or of reinforced plastic material. In some embodiments, the surface of the nozzle holder may be coated to reduce friction.

In some embodiments, at least one nozzle storage seat (e.g., at least two nozzle storage seats or all nozzle storage seats) includes a circumferential receiving contour for placement of a nozzle at the nozzle storage seat in a positive engagement and hence, securely against rotation. In certain embodiments, the inner (i.e., receiving) contour of the nozzle holder includes regions that are spaced at different radial distances (i.e., perpendicularly to the nozzle removal direction) from a center line of the nozzle holder such that the inner contour may not be radially symmetric. The outer contour of the nozzle is respectively configured so that the nozzle may be engaged (e.g., interlocked) with the receiving contour. For example, the outer contour of the nozzle may be provided by flat faces located along the largest circumferential edge of the outer contour, and the receiving contour may include respective flat or slightly inwardly curved faces. Such a configuration permits a positive engagement between the stored nozzle and the receiving contour, which enables a torque to be transferred to the nozzle. In this manner, when the nozzle holder is rotated about the center line, the nozzle rotates with the nozzle holder, so that the nozzle can be screwed into or unscrewed from the laser processing head.

In addition to laser processing heads that provide a screw connection for nozzles, in certain embodiments, laser processing heads onto which the nozzles may be clipped can also be used. In such cases, at least one nozzle storage seat may include a stop extending transversely to the nozzle removal direction for contact with the processing head, in order to provide an engagement mechanism at the processing head so that the nozzle can be pushed into the laser processing head.

In some embodiments, at least one such nozzle storage seat includes a clamping and/or snap-in locking device that produces a holding force on the nozzle in a direction opposite to the nozzle removal direction. In this manner, forces exerted on the nozzle (e.g., by seals or positive engagements with the processing head) do not result in the processing head pulling the nozzle along with the processing head as the processing head is retracted. Rather, the nozzle is retained securely at the nozzle storage seat.

In certain embodiments, a clamping device may be used when the nozzle storage seat or the receiving contour formed thereon includes one or more radially inwardly extending spring-loaded or mechanically operated projections that engage corresponding recesses or suitable contours on the nozzle in order to secure the nozzle at the nozzle storage seat.

In some embodiments, the clamping and/or snap-in locking device includes at least one slide member movable transversely to the nozzle removal direction for securing the nozzle at the nozzle storage seat. The slide member may be displaced radially outwards against the action of a restoring force as the nozzle is inserted, thereby generating a holding force that holds the nozzle at the nozzle storage seat as the processing head is retracted. The slide member can be released by the processing head itself or by a mechanical mechanism (e.g., a mechanical drive).

In certain embodiments, the nozzle holder includes at least one resilient insert that forms at least one nozzle storage seat and that provides a mechanism for applying the holding force. In some embodiments, the resilient insert may be made of an elastomer, such as nitrile butadiene rubber (NBR), a fluoropolymer (e.g., FPM), or silicon. The insert may have a substantially funnel-shaped construction and extend over the entire nozzle storage chamber. Alternatively, a separate resilient insert can be provided at each nozzle storage seat. As a nozzle is placed at its nozzle storage seat, the resilient insert is pressed outwards in a radial direction (i.e., perpendicular to the nozzle removal direction) and applies a clamping force to the nozzle. In certain embodiments, the resilient insert reproduces to some extent the outer contours of the different nozzles at every level of each nozzle storage seat.

In some embodiments, the nozzle holder receives nozzles of different types (e.g., different outer contours), allowing the nozzle holder to be used in a versatile manner. The step heights of the nozzle storage seats and the spacing of the step heights can be selected such that only a single nozzle can be stored in the nozzle holder, since two nozzles stored simultaneously can collide with each another.

In certain embodiments, the nozzle holder may be advantageously configured such that at least two nozzles of different size and/or differently shaped outer contours can be stored in at least two nozzle storage seats, lying one above the other. This can be achieved by selecting the spacing of the receiving levels or the nozzle storage seats along the nozzle removal direction such that the spacing is sufficiently large or appropriately formed according to the geometry of the nozzles so that at least two nozzles can be stored one above the other in the nozzle holder.

In some embodiments, a nozzle changer includes several nozzle holders as described above that are arranged in a common storage device. Because it is possible to receive nozzles of different types in the same nozzle holder and to simultaneously store several nozzles in a single nozzle holder, the number of nozzle holders required in the nozzle changer can be reduced compared to conventional nozzle changers. Such nozzle changers are compact and small and may have an increased holding capacity. Such nozzle changers can include nozzle holders of different types and nozzle holders with differently constructed nozzle storage seats. In certain embodiments, the nozzle changer may be simplified by advantageously using nozzle holders that all have the same construction.

In some embodiments, the nozzle holders are spring-mounted in the nozzle removal direction in order to accommodate positioning errors.

In certain embodiments, the nozzle changer includes a drive that produces a rotational movement of at least one nozzle holder about the center line along the nozzle removal direction. The rotational movement of the nozzle holder enables a nozzle to be screwed into or unscrewed from the laser processing head. In some embodiments, the drive is a motor that is coupled via a toothed belt drive or gearwheels to a toothed pulley on the nozzle holder. In order to operate the nozzle changer with a single motor, it is advantageous to couple at least two (e.g., all) nozzle holders of the nozzle changer to the motor via toothed belt drives or gearwheels. Alternatively, each nozzle holder can be provided with its own motor. For push-fit nozzles, the motor may not be operated or may not be required.

In certain embodiments, a laser processing machine for processing workpieces includes a processing head, a nozzle that is securable to the processing head, and a nozzle changer configured for mounting nozzles to and demounting nozzles from the processing head that is constructed as described above. The processing head is movable on the laser processing machine along the nozzle removal direction so that it can be introduced into the nozzle storage chamber through the nozzle removal opening. The processing head is able to compensate for the difference in height of the nozzle storage seats in the nozzle removal direction. The processing head may include a screw thread for fastening a nozzle and/or a snap-in locking device or clamping device for snap-locking or clamping the nozzle.

Other aspects, features, and advantages will be apparent from the description, the drawings, and the claims. The features described above and hereafter may likewise be used alone or together in any combination. The exemplary embodiments illustrated and described are not to be understood as an exhaustive list but are merely of an exemplary nature.

DESCRIPTION OF DRAWINGS

FIG. 1b is an enlarged perspective view of a portion of the nozzle changer of FIG. 1a.

FIG. 3 is a perspective view of a nozzle changer including a drive for producing rotational movement of the nozzle holders of FIG. 1a.

FIGS. 4a and 4b are cross-sectional views of the nozzle changer of FIG. 3.

DETAILED DESCRIPTION

Figure 1A:
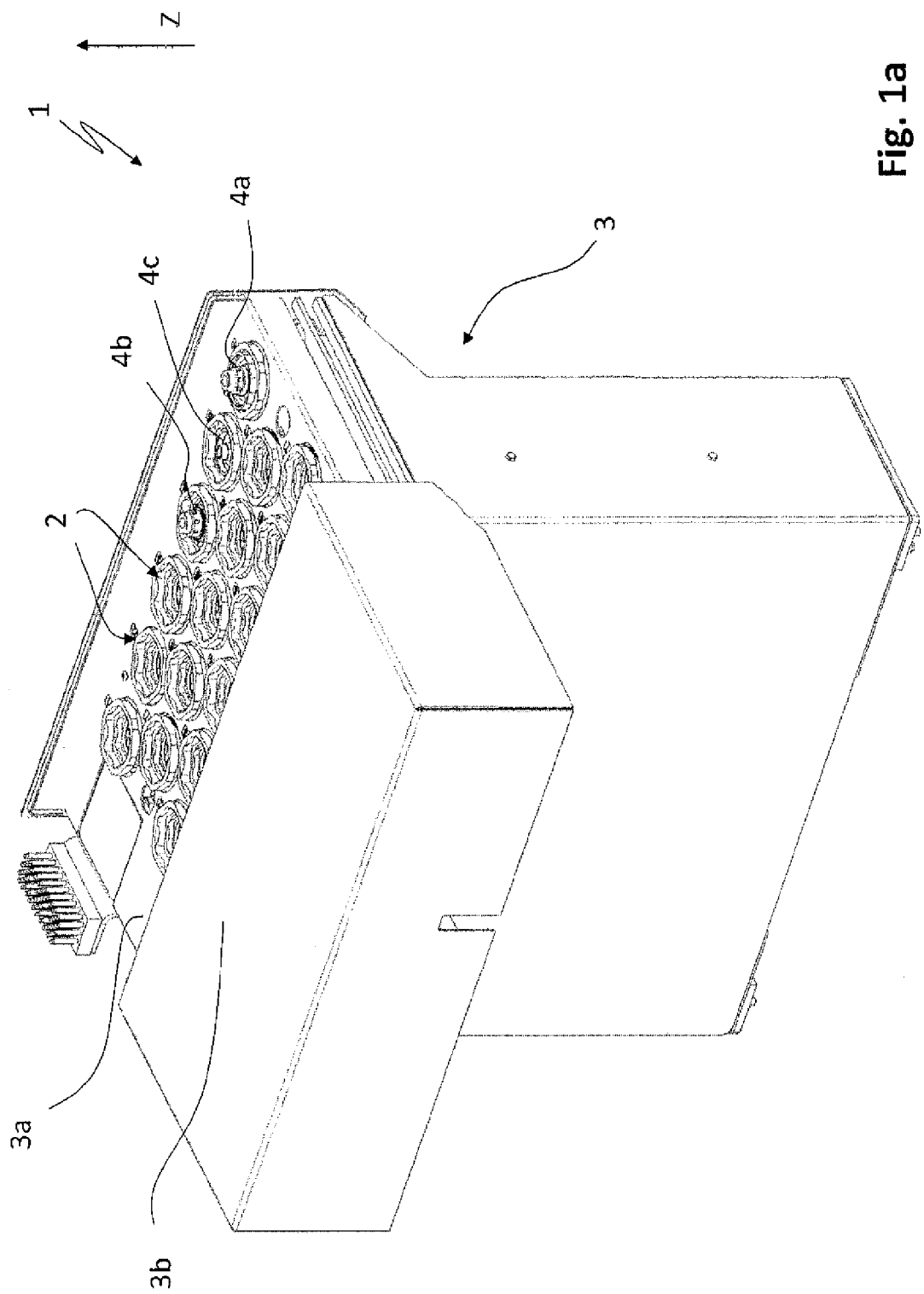
FIG. 1a is a perspective view of a nozzle changer including multiple nozzle holders.
Figure 1B:
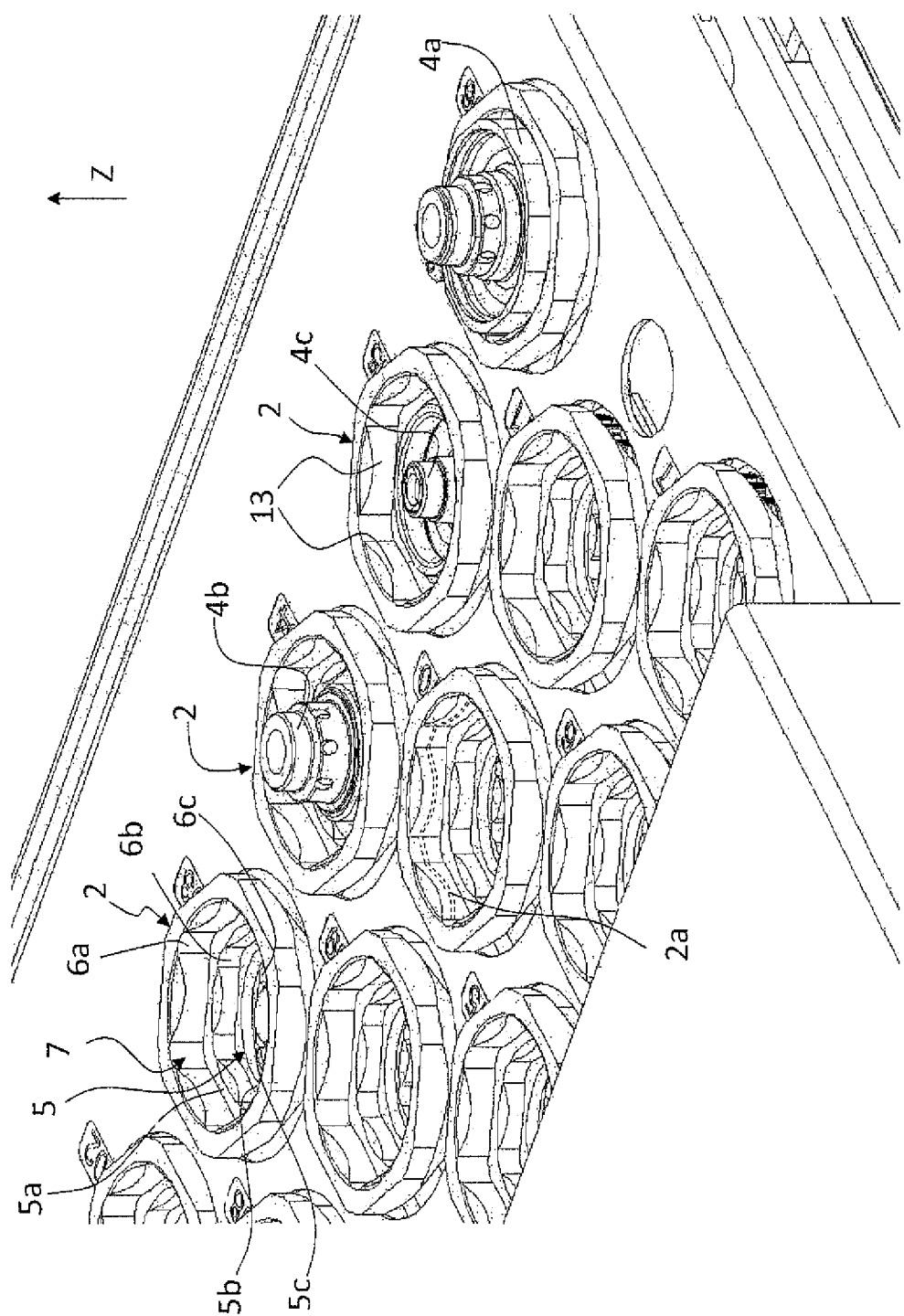

FIGS. 1a and 1b are perspective views of a nozzle changer 1 that includes several nozzle holders 2 that are disposed within a storage device 3. The storage device 3 includes a housing 3a and a cover 3b. The nozzle holders 2 are coupled with various types of nozzles 4a-c (e.g., nozzles with different outer contours).

Each nozzle holder 2 includes a stepped storage chamber 5 that has several nozzle storage seats 5a-c. The nozzle storage seats 5a-c are located at different positions along a nozzle removal direction Z. The nozzle storage chamber 5 further includes an opening 7 through which the nozzles 4a-c can be delivered to and removed from the nozzle storage chamber 5. Each nozzle storage seat 5a-c has a circumferential receiving contour 6a-c that is configured to receive an outer contour of the respective nozzle 4a-c with a positive fit.

For example, the nozzle storage seat 5c is configured to receive the nozzle 4c, which has the smallest outer diameter of the nozzles 4a-c. The nozzle storage seat 5c is located at the bottom of the nozzle holder 2 (i.e., furthest away from the opening 7 of the nozzle storage chamber 5). The nozzle storage seats 5a and 5b are located above the nozzle storage seat 5c (i.e., closer to the opening 7 of the nozzle storage chamber 5) and have larger diameters than that of the nozzle storage seat 5c. The cross-section of the uppermost nozzle storage seat 5a and the associated receiving contour 6a are so large that even the nozzle 4c, which is located furthest away from the opening 7, can be gripped by a processing head (not shown in FIGS. 1a and 1b). All of the nozzles 4a-c storable in the nozzle holder 2 can thus be inserted and subsequently removed from the nozzle holder 2 through the opening 7.

Nozzle holders that are designed to accommodate a single nozzle at a single nozzle storage seat can therefore be supplemented by at least one nozzle storage seat (e.g., two or more nozzle storage seats offset in steps from one other), which permits nozzles of different types to be stored at different positions. For example, the diameters of the nozzle storage seats 5a-c and the respective circumferential receiving contours 6a-c increase in the nozzle removal direction Z.

Figure 2C:
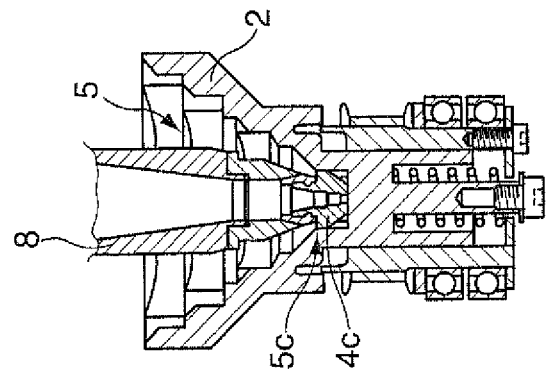
FIGS. 2a-c are cross-sectional views of three nozzle holders of the nozzle changer of FIG. 1a, coupled with three different nozzles that are removable using a laser processing head.
Figure 2B:
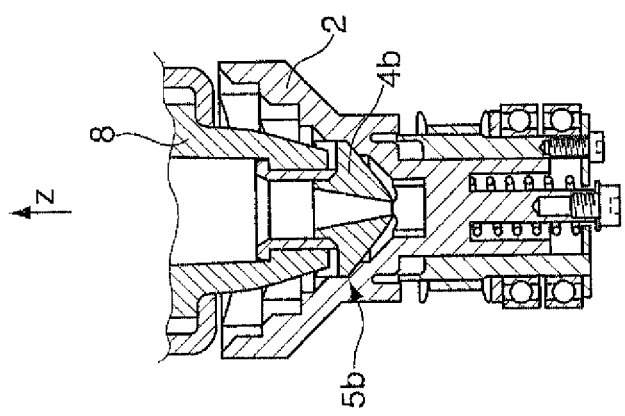
Figure 2A:
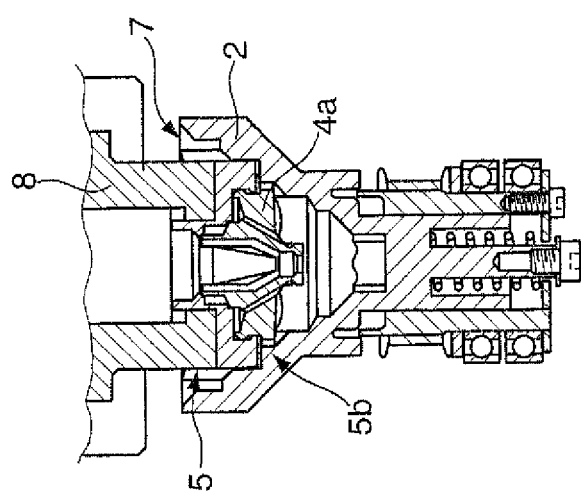

FIGS. 2a-c are cross-sectional views of the nozzle holder 2 fitted with different respective nozzles 4a-c. Each of the nozzles 4a-c has a different outer contour (e.g., a different outer surface geometry including a different outer diameter). According to the respective outer contours, the nozzles 4a-c are disposed within respective nozzle storage seats 5a-c at different heights. A processing head 8 can be introduced into the nozzle storage chamber 5 through the opening 7 in order to remove a particular nozzle 4a-c. While the nozzles 4a-c are being changed, the nozzle storage seats 5a-c in the nozzle holder 2 are accessed by advancing the processing head 8 along the nozzle removal direction Z.

When the nozzles 4a-c are secured (e.g., fastened) to the processing head 8 with a snap-lock or push-fit connection, then such a connection may be released in order to remove the nozzles 4a-c from the processing head 8. In this manner, a holding force (e.g., seal friction or a positive engagement) acting opposite to the nozzle removal direction Z may secure the nozzles 4a-c to the respective nozzle storage seats 5a-c. Applying such a holding force to the nozzles 4a-c can maintain the nozzles 4a-c at the nozzle storage seats 5a-c while the processing head 8 is retracted.

Referring again to FIG. 1b, the nozzle holder 2 may include an insert 2a that is configured to apply a holding force to the nozzles 4a-c. The insert 2a is a resiliently constructed stepped inner contour that is similar, in at least some extent, to the outer contours of the nozzles 4a-c at the respective nozzle storage seat 5a-c. Alternatively, the nozzle holder 2 may include a separate insert 2a at each nozzle storage seat 5a-c. As a result of the resilient insert 2a applying a sufficient holding force to the nozzle 4a-c in the direction opposite to the nozzle removal direction Z, the nozzle 4a-c remains in the nozzle holder 2 after being released from the processing head 8.

Referring again to FIGS. 2a-c, the nozzles 4a-c have an external screw thread that allows the nozzles 4a-c to be secured (e.g., screwed) into the processing head 8. The external screw thread is located along the outer circumference of the nozzle 4a-c, which faces the processing head 8. Accordingly, the nozzle storage seats 5a-c provided for the respective nozzles 4a-c, to be screwed into the laser processing heard 8 must not only allow the nozzles 4a-c to be positioned axially and radially, but also permit a transfer of torque from the nozzle holder 2 to the nozzles 4a-c, which is achieved by a positive engagement between the respective receiving contours 6a-c (see FIG. 1b) of the nozzle storage seats 5a-c and the respective nozzles 4a-c.

Referring again to FIG. 1b, such a positive engagement is provided by the engagement between several flat faces disposed along the largest circumference of the outer contours of the nozzles 4a-c and at least two faces 13 of the receiving contours 6a-c, which hold the nozzles 4a-c securely against rotation. The faces 13 of the receiving contours 6a-c may be flat or curved slightly inwardly. The nozzles 4a-c may have hexagonal heads. Accordingly, the receiving contours 6a-c of the respective nozzle storage seats 5a-c are formed as hexagonal recesses that have differing diameters according to the respective nozzle storage seats 5a-c. Alternatively, in some embodiments, the nozzles 4a-c include faces that are curved slightly outwardly, and the receiving contours 6a-c of the respective nozzle storage seats 5a-c accordingly have several flat faces.

Figure 3:
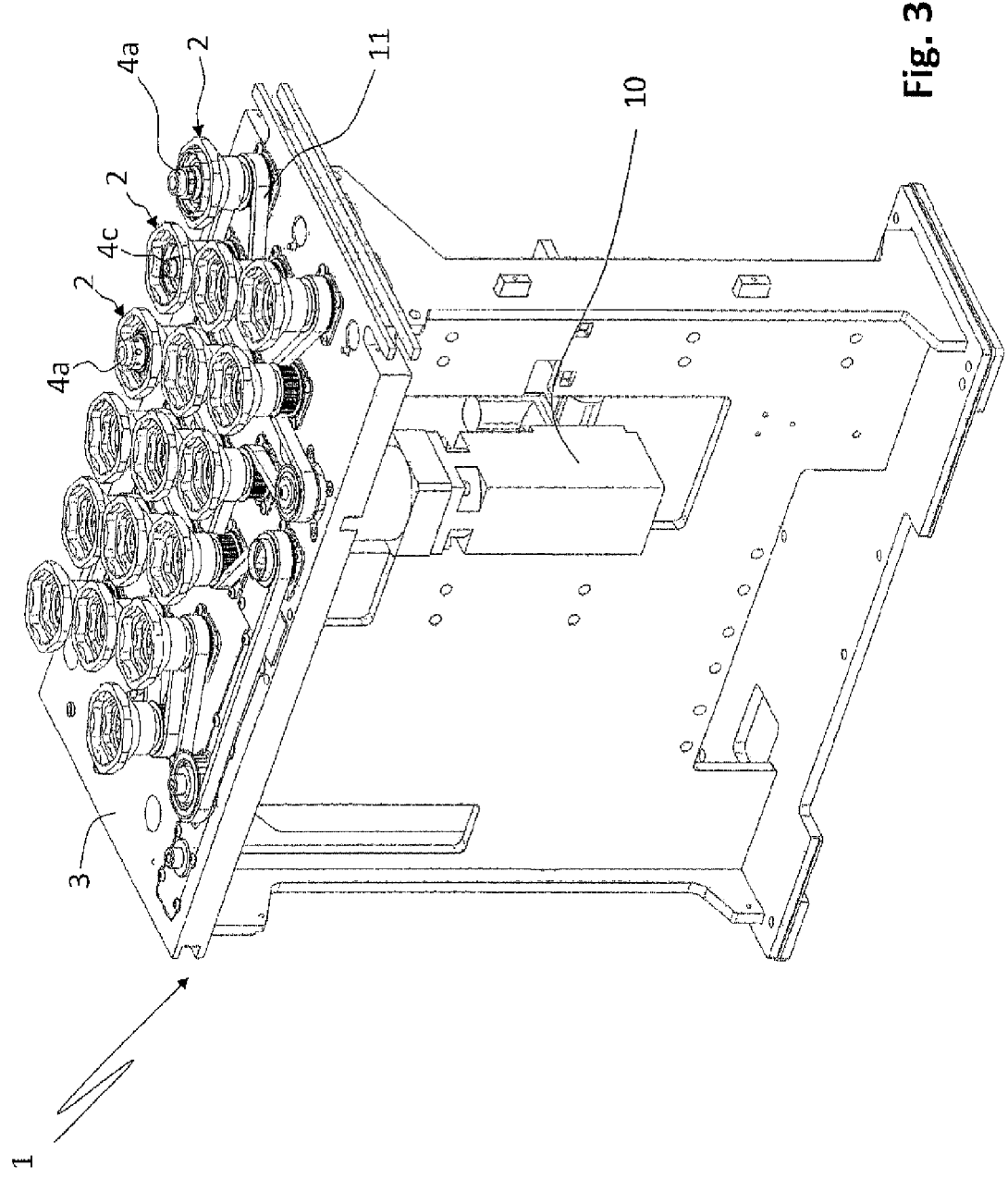

FIG. 3 is a perspective view of a nozzle changer 1 that allows the nozzles 4a-c to be screwed onto a processing head (e.g., the processing head 8 of FIGS. 2a-c). The nozzle holders 2 are mounted on a base plate, which forms a portion of the storage device 3. A motor 10 is used as a drive for producing a rotational movement and drives a toothed drive belt 11 that moves around toothed pulleys 12 (see FIG. 4a).

Referring to FIGS. 4a and 4b, the toothed pulleys 12 have a positively engaging opening, into which the nozzle holder 2 is inserted such that the nozzle holder 2 rotates jointly with the toothed pulley 12 about a center line z of the nozzle holder 2. Such anti-turn mounting transfers torque from the nozzle holder 2 to the nozzles 4a-c. A clearance A is formed within the toothed pulley 12 in the radial direction (i.e., perpendicular to the center line z) between the toothed pulley 12 and the nozzle holder 2 that is carried by the toothed pulley 12. Such clearance A can accommodate any slight positional offset between the processing head and the nozzle holder 2 during a screwing procedure. The nozzle holder 2 is spring-mounted (providing the clearance B) by a helical spring 14 in the direction of the center line z in order to accommodate positional errors.

When screwing a nozzle 4a-c onto the processing head 8, the nozzle holder 2 is rotated, and due to the clearances A and B, the nozzle 4a-c is able to adjust to the screw thread of the processing head 8 in several axial directions, thereby preventing tilting and "seizing" of the nozzle 4a-c.

In some embodiments, both the radial clearance A and the clearance B in the direction of the center line z can optionally be provided by using the insert 2a with the nozzle holder 2 such that using the helical spring 14 is unnecessary. In the case of push-fit nozzles, the resilient insert 2a can additionally apply the holding force in a direction opposite the nozzle removal direction Z.

In certain embodiments, spring or mechanically (e.g., pneumatically) operated slide members 16 may be used at the nozzle storage seats 5a-c of the nozzle holder 2 alternatively or in addition to the resilient insert 2a to produce a holding force in the direction opposite to the nozzle removal direction Z. Upon insertion of the nozzle 4a-c, the slide members 16 are pressed radially outwards and, in this manner, clamp or lock the nozzle 4a-c in at the respective nozzle storage seat 5a-c. Thus, the slide members 16 are movable transversely to the nozzle removal direction Z against an action of a restoring force. Alternatively, suitable sensors can be used to detect the presence of the nozzle 4a-4c, and a mechanical (e.g., pneumatic) locking element can be actuated by a machine control system.

In some embodiments, the nozzle changer 1 may be additionally fitted with additional nozzle holders that are not rotatable. In the case where only push-fit nozzles are fastened to the processing head 8 and need to be changed, a drive for rotating the nozzle holders 2 about the center line z can be omitted.

The differently configured nozzle storage seats 5a-c within the nozzle holder 2 allow different types of nozzles to be stored in the same nozzle holder 2. In some embodiments, a single nozzle 4a-c may be stored in the nozzle holder 2, which permits direct access to all of the stored nozzles 4a-c. Optionally, several nozzles 4a-c can be placed one above the other in the same nozzle holder 2, thereby reducing the number of nozzle holders 2 needed to store a given number of nozzles. This type of storage arrangement requires a suitable loading and unloading procedure. For example, the spacing of the nozzle storage seats 5a-c should be suitably adjusted to the dimension of the nozzles 4a-c to be stored in the nozzle removal direction Z, (i.e., the step height within the nozzle storage chamber 5).

Figure 5:
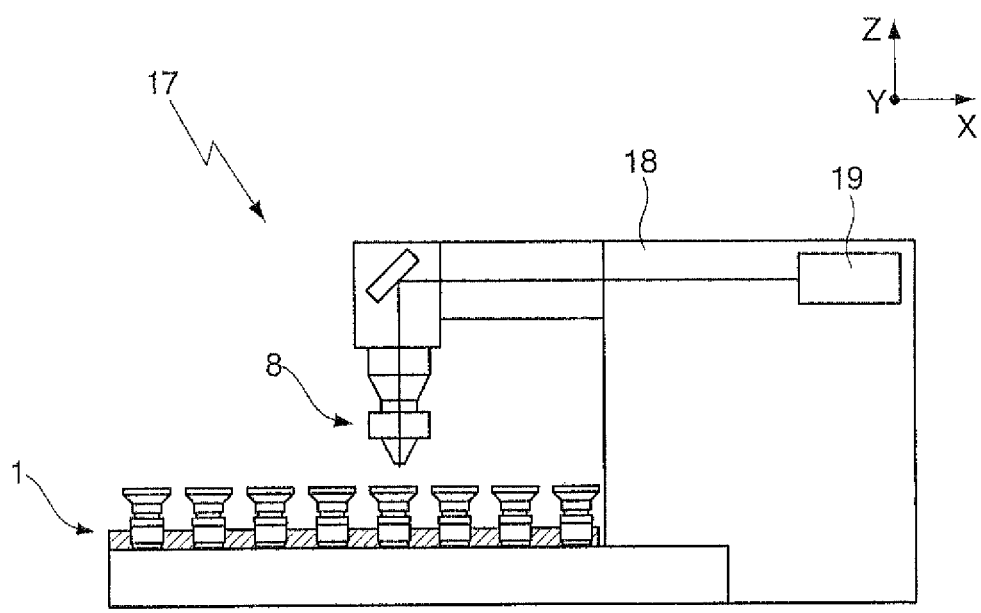
FIG. 5 is a side view of a laser processing machine including a processing head and a nozzle changer.

FIG. 5 is a side view of the nozzle changer 1 included within a laser processing machine 17. The laser processing machine 17 includes a stationary machine body 18 and a processing head 8 that is movable in three directions X, Y, and Z relative to the machine body 18. The nozzle changer 1 may be located along a peripheral region of a processing area or can be moved (e.g., pivoted) into the processing area. The laser processing machine 17 also includes a laser beam source 19, via which a laser beam can be directed onto a workpiece (not shown). The laser beam source 19 is not activated during a nozzle change procedure.

In some embodiments, the nozzle holder 2 includes the stepped nozzle storage chamber 5, which widens towards the nozzle removal opening 7. The individual steps or storage levels within the nozzle storage chamber 5 each forms the nozzle storage seats 5*a-c*. The receiving contours 6*a-c* of the respective nozzle storage seats 5*a-c* are adapted to the outer contours of the specific types of nozzle 4*a-c*, which are different for each nozzle storage seat 5*a-c*. The nozzle holder 2 can therefore be used for storage and for exchanging different types of nozzles that have various shapes and/or outer contour sizes.

A number of embodiments have been described. Nevertheless, it will be understood that various modifications may be made without departing from the spirit and scope of the disclosure. Accordingly, other embodiments are within the scope of the following claims.

What is claimed is:

1. A nozzle holder for a nozzle changer that is configured for at least one of mounting nozzles to and demounting nozzles from a processing head of a laser processing machine, the nozzle holder comprising a nozzle storage chamber that widens along a nozzle removal direction to a nozzle removal opening, wherein the nozzle storage chamber comprises at least two nozzle storage seats that are offset in steps from each other and that store respective nozzles.

2. The nozzle holder according to claim 1, wherein at least one nozzle storage seat includes a circumferential receiving contour that holds a nozzle securely against rotation.

3. The nozzle holder according to claim 1, wherein at least one nozzle storage seat includes at least one of a clamping and a snap-in locking device that produces a holding force in a direction opposite to the nozzle removal direction.

4. The nozzle holder according to claim 3, wherein the clamping or snap-in locking device includes at least one slide member movable transversely to the nozzle removal direction against an action of a restoring force.

5. The nozzle holder according to claim 1, wherein the nozzle holder includes at least one insert that forms at least one nozzle storage seat.

6. The nozzle holder according to claim 1, further comprising at least two nozzles that are arranged one above the other in at least two different nozzle storage seats.

7. A nozzle changer comprising a plurality of nozzle holders that are arranged in a common storage device, wherein each nozzle holder comprises a nozzle storage chamber that widens along a nozzle removal direction to a nozzle removal opening, and wherein the nozzle storage chamber comprises at least two nozzle storage seats that are offset in steps from each other and that store respective nozzles.

8. The nozzle changer according to claim 7, wherein the plurality of nozzle holders are spring-mounted in the nozzle removal direction.

9. The nozzle changer according to claim 7, further comprising a drive that produces a rotational movement of at least one nozzle holder about a center line along the nozzle removal direction.

10. A laser processing machine for processing workpieces, the laser processing machine comprising:
a processing head;
a nozzle that is securable to the processing head; and
a nozzle changer configured for at least one of mounting the nozzle to and demounting the nozzle from the processing head, wherein the nozzle changer comprises a plurality of nozzle holders that are arranged in a common storage device, wherein each nozzle holder comprises a nozzle storage chamber that widens along a nozzle removal direction to a nozzle removal opening, and wherein the nozzle storage chamber comprises at least two nozzle storage seats that are offset in steps from each other and that store respective nozzles.

* * * * *